Dec. 17, 1957 D. E. URRY 2,817,041
CONTROL CIRCUITS FOR CATHODE RAY TUBES
Filed Dec. 17, 1956
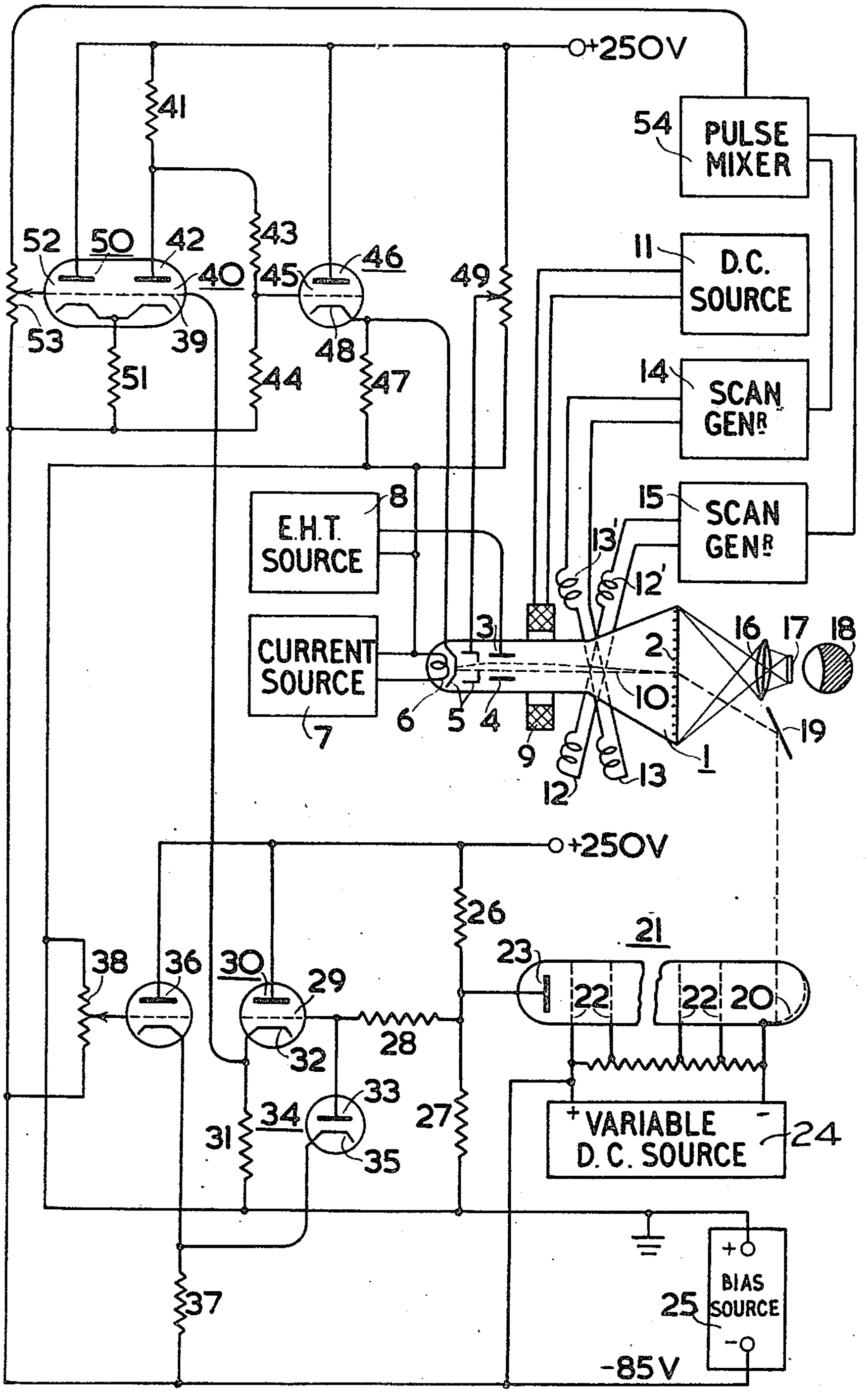

2,817,041

CONTROL CIRCUITS FOR CATHODE RAY TUBES

Denis Edward Urry, Forest Hill, London, England, assignor to Cinema-Television Limited, London, England, a British company Application December 17, 1956, Serial No. 628,658

Claims priority, application Great Britain January 11, 1956

2 Claims. (Cl. 315—10)

The present invention relates to improvements in control circuits for cathode ray tubes and is especially concerned to provide a circuit for reducing the effects of local variations in the efficiency of the fluorescent screen in a cathode ray tube employed as a scanning element in a television or like system.

In television systems and in similar arrangements such as flying-spot microscopes and apparatus for the electronic correction of colour printing negatives the cathode ray tube is often employed as a scanning element. A disadvantage from which it suffers in such applications is that local variations in the efficiency of the luminescent screen produce spurious components in the derived signal and it has previously been proposed, for example, in British patent specification No. 505,197, to employ negative feedback from a photocell exposed to light emitted by the screen in order to obviate or reduce this disadvantage.

In systems in which blanking between scanning periods is effected by suppressing the electron beam of the cathode ray tube, however, the simple application of negative feedback becomes impossible, since the action of the feedback circuit opposes the blanking. A further disadvantage of a simple negative-feedback system arises from the fact that microscopic portions of the tube screen may be completely unresponsive to electron bombardment. When such a dead portion of the screen is struck by the scanning electron beam the feedback circuit tends to produce an excessively high beam current in an endeavour to maintain a constant light output from the tube. This effect is usually insignificant in normal television applications, since the linear speed of the scanning beam is such that the voltage pulse applied to the cathode ray tube is of too brief a duration to cause damage, but where slow-speed scans are employed, considerable screen burning may thus be produced.

It is an object of the present invention to provide an improved cathode ray tube control circuit in which certain difficulties associated with hitherto known circuits are avoided or reduced.

More specifically it is an object of the invention to provide a cathode ray tube control circuit in which compensation is provided for local variations in the efficiency of the luminescent screen of said tube.

It is a further object of the invention to provide a cathode ray tube control circuit in which deleterious excessive beam current may be avoided when the electron beam in said tube encounters a screen area of low efficiency.

It is another object of the invention to provide a cathode ray tube control circuit which conveniently allows the electron beam of said cathode ray tube to be suppressed during retrace intervals in the scanning process by which the electron beam is deflected over the screen of the tube.

The features of this invention which are believed to be novel are set forth with particularity in the appended claims. The invention itself, however, together with further objects and advantages thereof, may best be understood by reference to the following description taken in conjunction with the accompanying drawing which is a circuit diagram of one embodiment of a cathode ray tube control circuit according to the invention.

In the drawing is shown a cathode ray tube 1 which includes a luminescent screen 2, an anode 3, modulator electrode or grid 4, cathode 5 and heater 6. Heater 6 is provided with an appropriate current from a source 7 while anode 3 is maintained at an appropriately high positive potential, conveniently some 25 kv., with respect to cathode 5 by a suitable source 8. The effect of these supplies is to cause the generation of an electron beam 10 within the tube. Around the neck of tube 1 is placed a focus coil 9, to which an appropriate current is supplied by a source 11. Also about the neck of tube 1 are placed pairs of deflector coils 12, 12', 13, 13' to which scan generators 14, 15 supply currents appropriate to cause electron beam 10 to be deflected over screen 2 in a predetermined pattern, including retrace intervals during which the electron beam is required to be suppressed.

Light from screen 2 is focused by means of a lens 16 upon an object 17 which in the case illustrated is a transparency through which light from screen 2 passes to a light-sensitive device 18 which develops electric signals corresponding to the scanning of object 17 by the pattern in which electron beam 10 is deflected over screen 2.

Some light from screen 2 is deflected by a mirror 19 to fall upon the photo-electrically sensitive cathode 20 of a multiplier photocell 21. This cell includes a number of dynodes 22 maintained by means of a suitable source 24 at potentials increasingly positive with respect to the cathode, so that the electron emission from cathode 20 is greatly increased and a much larger signal current flows to the collector 23 of the cell. Source 24 is conveniently so arranged that the voltages which it provides between successive dynodes may be simultaneously varied to adjust the multiplier gain.

The last and most positive dynode encountered by the electron stream is connected to the most positive terminal of source 24 and also to the negative terminal 25 of a voltage source of which the positive terminal is earthed. The potential of this source is conveniently −85 v. The collector 23 of photocell 21 is connected to a potential divider comprising resistors 26 and 27 which are connected in series across a voltage source of which the negative terminal is earthed. The potential of this source is conveniently +250 v. The values of resistors 26 and 27 are so chosen that under normal operating conditions the collector is approximately at earth potential.

The potential appearing at collector 23 is fed by way of a resistor 28 to the grid 29 of a thermionic valve 30 which is connected as a cathode follower with a load resistor 31 connected between cathode 32 of valve 30 and the negative terminal of bias source 25. Grid 29 of valve 30 is also connected to the anode 33 of a diode 34, the cathode 35 of which is taken to a low-impedance voltage source formed by the cathode circuit of a cathode-follower valve 36 having a load resistor 37 in its cathode lead and having its grid potential controlled by a potentiometer 38 connected across the previously mentioned negative supply from source 25.

The signal arising at the cathode 32 of valve 30 thus becomes more negative with increased light output from tube 1 and more positive with decreased output. Diode 34 serves, in accordance with a feature of the present invention, to limit the positive-going excursion of grid 29 of valve 30, and in consequence that of its cathode, to a value determined by the setting of potentiometer 38. This arrangement prevents the brightness-levelling circuit described below from inducing deleterious high bursts of beam current in tube 1 when an insensitive area is encountered in the screen.

Signals from cathode 32 of valve 30 are applied to the grid 39 of a valve 40 and under normal conditions appear amplified and reversed in polarity across a load resistor 41 connected between the anode 42 of valve 40 and the positive voltage source. These amplified signals are taken by way of a direct-current coupling circuit consisting of resistors 43 and 44 to the grid 45 of a cathode-follower valve 46 having a load resistor 47 connected between its cathode 48 and ground. Signals appearing across resistor 47 are applied to the cathode of tube 1.

The grid potential of tube 1 is controlled by means of a potentiometer 49 connected across the positive supply.

In the circuit as thus far described, any diminution of light output from tube 1 will produce a proportional negative excursion of the cathode of the tube, which will produce an increase in beam current such as to restore the initial brightness. This action continues until the limit set by the diode 34 is reached, when no further negative excursion of the tube cathode will occur.

Valve 40 is also coupled to a further valve 50 by means of a resistor 51 in their common cathode lead. The grid 52 of valve 50 is driven positively by pulses applied thereto from a potentiometer 53 to which such pulses are applied by a device 54. Device 54 is fed with signals derived during the retrace intervals of scan generators 14 and 15 and is arranged to apply positive pulses to potentiometer 53 whenever either of scan generators 14 or 15 is in a retrace period.

When grid 52 of valve 50 is driven sufficiently positive the voltage drop produced in resistor 51 is sufficient to cut off valve 40. The anode of valve 40 therefore goes positive, followed by the cathode of tube 1, so that the beam is suppressed. When the positive pulse applied to potentiometer 53 by device 54 ceases, valve 40 is again allowed to pass current to an extent determined by its grid potential and the apparatus resumes its normal operation.

To obtain correct operation of the circuit the following preliminary procedure is adopted.

It is first arranged that the circuit 54 supplying blanking pulses to potentiometer 53 is retained in its interpulse position in which a fixed potential positive with respect to ground is applied to potentiometer 53. Grid 39 of valve 40 is then grounded and potentiometer 53 is adjusted until the cathode of the cathode ray tube 1 attains a desired voltage above ground potential.

The beam current passed by the tube under these conditions is now adjusted to the required value by means of potentiometer 49.

Grid 39 of valve 40 is now ungrounded and the gain of photomultiplier 21 is adjusted by means of variable voltage source 24 until the beam current again has the required value.

The equipment will now operate to maintain a constant brightness on the screen of tube 1, save where a great reduction in brightness arises due to the beam falling upon a dead spot on the screen or during blanking intervals, when the generation of excessive feedback potentials is prevented by the action of diode 34 or the feedback is prevented by the gating action of valves 40, 50 when a positive-going pulse is applied to the grid of valve 50 during the retrace intervals of the scanning process.

While a particular embodiment of the present invention has been described it is apparent that changes and modifications may be made without departing from the invention in its broader aspects. The aim of the appended claims, therefore, is to cover all such changes and modifications as fall within the true spirit and scope of the invention.

I claim:

1. In apparatus comprising in combination a cathode ray tube including means for developing an electron beam and for directing it towards a luminescent screen, scan generator means for scanning said beam over said screen in a predetermined pattern including retrace intervals during which said beam should be suppressed, optical means for imaging said pattern upon an object, and light sensitive means disposed to receive light from said screen after modification by said object to develop signals representative of the scanning of said object in said pattern; means for compensating for local variations in the efficiency of said screen comprising a photomultiplier exposed to light emitted from any part of said screen and having its cathode, dynodes and collector electrode connected to spaced points on a voltage divider fed from a source of potential, a cathode-follower valve, a resistance network connecting said collector electrode to the grid of said cathode-follower valve to transfer signal potentials therebetween, rectifier means connected between said grid and a source of potential, said rectifier being so poled as to restrict positive-going excursions of said grid, a thermionic valve pair coupled by a common cathode resistor, a lead connecting the grid of a first valve of said pair to the cathode of said cathode follower, means operated by said scan generators for developing a positive-going potential during the retrace intervals in the output of said generator means, means for applying said potential to the grid of the second valve of said valve pair, a load resistor connected to the anode of said first valve of said pair, a second cathode follower valve, a resistance network connected between the anode of said first valve of said valve pair and the grid of said second cathode follower valve and a lead connecting the cathode of said second cathode follower valve to the cathode of said cathode ray tube whereby the brightness of said screen is maintained constant over a predetermined range only of variation in the luminous efficiency of said screen and is suppressed during retrace intervals of said scanning process.

2. In apparatus comprising in combination a cathode ray tube including means for developing an electron beam and for directing it towards a luminescent screen, scan generator means for scanning said beam over said screen in a predetermined pattern including retrace intervals during which said beam should be suppressed, optical means for imaging said pattern upon an object, and light sensitive means disposed to receive light from said screen after modification by said object to develop signals representative of the scanning of said object in said pattern; means for compensating for local variations in the efficiency of said screen comprising a photomultiplier exposed to light emitted from all parts of said screen and having its cathode, dynodes and collector electrode connected to spaced points on a voltage divider, a variable source of potential connected to supply said voltage divider, a cathode-follower valve, a resistance network connecting said collector electrode to the grid of said cathode-follower valve to transfer signal potentials therebetween, a second thermionic valve, a source of potential negative with respect to earth, a resistor connecting the cathode of said valve to said source, a potentiometer connected across said source, a lead connecting the slider of said potentiometer to the grid of said valve, rectifier means connected between the cathode of said second valve and the grid of said first valve so as to conduct when said grid tends to become more positive than said cathode, a thermionic valve pair coupled by a common cathode resistor, a lead connecting the grid of a first valve of said pair to the cathode of said cathode follower, means operated by said scan generator means for developing a positive-going potential during retrace intervals in said scanning pattern and means for applying said potential to the grid of the second valve of said valve pair, a load resistor connected to the anode of said first valve of said pair, a second cathode follower valve, a resistance network connected between the anode of said first valve of said valve pair and the grid of said second cathode follower valve and a lead connecting the cathode of said second cathode follower valve to the cathode of said cathode ray tube whereby the brightness of said screen is maintained constant over a predetermined range only of the variation in the luminous efficiency of said screen and is suppressed during retrace intervals of said scanning process.

References Cited in the file of this patent

UNITED STATES PATENTS

| | | |
|---|---|---|
| 2,402,058 | Loughren | June 11, 1946 |
| 2,523,328 | Ranks | Sept. 26, 1950 |
| 2,719,247 | Bedford | Sept. 27, 1955 |